United States Patent
Chevallier et al.

(10) Patent No.: US 12,508,851 B2
(45) Date of Patent: Dec. 30, 2025

(54) COMMUNICATION METHOD FOR A PRESSURE MONITORING SYSTEM

(71) Applicant: Continental Automotive Technologies GmbH, Hannover (DE)

(72) Inventors: Vincent Chevallier, Plaisance du Touch (FR); Jean-Philippe Boisset, Montauban (FR); Frédéric Lathiere, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 6 days.

(21) Appl. No.: 18/768,631

(22) Filed: Jul. 10, 2024

(65) Prior Publication Data
US 2025/0026158 A1  Jan. 23, 2025

(30) Foreign Application Priority Data
Jul. 20, 2023  (FR) ...................................... 2307765

(51) Int. Cl.
*B60C 23/04* (2006.01)

(52) U.S. Cl.
CPC ...... *B60C 23/0438* (2013.01); *B60C 23/0445* (2013.01)

(58) Field of Classification Search
CPC ............ B60C 23/0438; B60C 23/0445; B60C 23/0437; B60C 23/0455; B60C 23/0462
(Continued)

(56) References Cited

U.S. PATENT DOCUMENTS

| 7,511,609 B2 | 3/2009 | Hammerschmidt |
| 7,716,976 B2 * | 5/2010 | Lin ..................... B60C 23/0433 73/146.4 |

(Continued)

FOREIGN PATENT DOCUMENTS

| CN | 2696880 Y | 5/2005 |
| CN | 205871638 U | 1/2017 |

(Continued)

OTHER PUBLICATIONS

"Bluetooth Core Specification" Version 5.0, vol. 1, Part A, Bluetooth SIG Proprietary, Communication Topoloy and Operation, Dec. 6, 2016, pp. 234-535. (16 pages).

(Continued)

*Primary Examiner* — Eric Blount
(74) *Attorney, Agent, or Firm* — Buchanan Ingersoll & Rooney P.C

(57) ABSTRACT

A communication method for a monitoring system including a wheel unit intended to communicate with an electronic control unit by way of Bluetooth® Low Energy communication in order to establish two-way communication between the wheel unit and the electronic control unit. The wheel unit being able to transmit periodic signals of short duration to attempt to connect to the electronic control unit. The electronic control unit being able to acknowledge the periodic signals by transmitting a frame of radiofrequency signals to the wheel unit. The method includes automatically adapting the radiofrequency transmission power of the wheel unit when the wheel unit is in "advertising" mode, during which the wheel unit transmits signals of variable radiofrequency power so as to determine a minimum radiofrequency power starting from which the electronic control unit is capable of acknowledging at least one signal by (Continued)

transmitting a frame of radiofrequency signals to the wheel unit.

10 Claims, 1 Drawing Sheet

(58) Field of Classification Search
USPC .......................................................... 340/447
See application file for complete search history.

(56) References Cited

U.S. PATENT DOCUMENTS

| | | | |
|---|---|---|---|
| 7,760,080 B2 * | 7/2010 | Breed | ................. B60C 23/0433 |
| | | | 340/447 |
| 10,442,253 B2 | 10/2019 | Werner et al. | |
| 2023/0234406 A1 | 7/2023 | Yu | |

FOREIGN PATENT DOCUMENTS

| | | |
|---|---|---|
| CN | 107972423 B | 12/2019 |
| CN | 113212077 A | 8/2021 |
| FR | 3106012 A1 | 7/2021 |
| KR | 100955365 B1 | 4/2010 |
| TW | I799114 B | 4/2023 |

OTHER PUBLICATIONS

French Search Report mailed Feb. 26, 2024, by the French Patent Office for corresponding Application No. FR2307765, with machine translation. (40 pages).

* cited by examiner

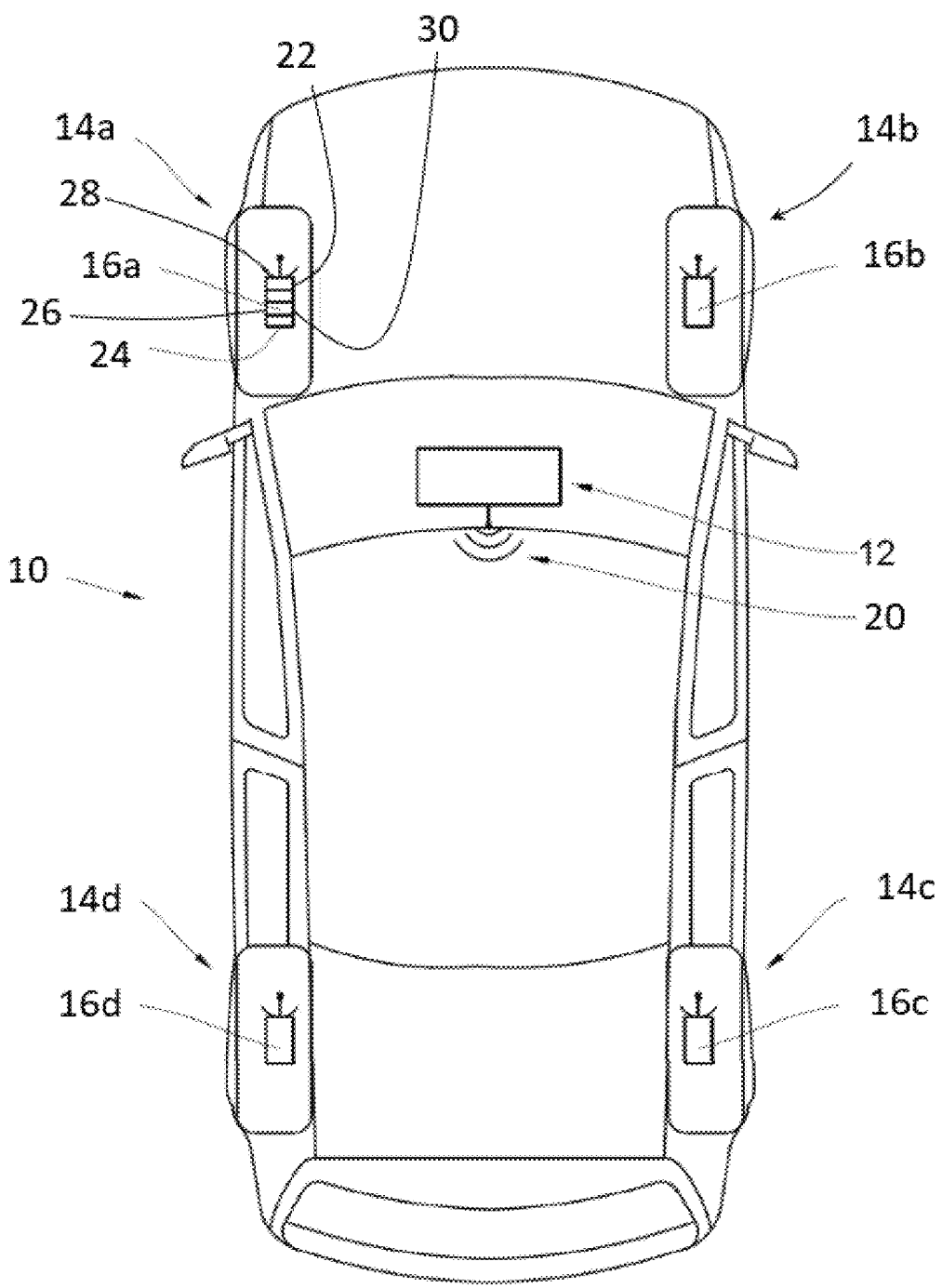

COMMUNICATION METHOD FOR A PRESSURE MONITORING SYSTEM

CROSS REFERENCE TO RELATED APPLICATIONS

This application claims priority to French Application No. 2307765, filed Jul. 20, 2023, the contents of such application being incorporated by reference herein.

FIELD OF THE INVENTION

The present invention relates to a communication method, and in particular for a pressure monitoring system intended to measure the pressure in a tire of a motor vehicle.

BACKGROUND OF THE INVENTION

Motor vehicle safety legislation requires manufacturers to provide means for monitoring the pressure of tires.

To this end, multiple pressure monitoring systems have been developed and put on the market in recent years.

As is known per se, these pressure monitoring systems, commonly designated "TPMS" (for "tire pressure monitoring system"), typically comprise at least one wheel unit (comprising at least one pressure sensor) arranged inside the chamber defined by the tire and the rim of the wheel of a vehicle, and remote computing means in radiofrequency communication with this wheel unit, these computing means generally being located in the electronic computer of an on-board electronic control unit of the vehicle (commonly designated "ECU").

The wheel unit may be fixed inside the tread of the tire, or to the inflation valve of this tire, which inflation valve is mounted inside an orifice formed on the rim.

The wheel unit is typically supplied with power by a non-rechargeable battery that may have a service life of ten years, for example.

The wheel unit and the ECU communicate via a radiofrequency communication network. The wheel unit comprises a first transceiver device and the ECU comprises a second transceiver device.

A radiofrequency frame, generally referred to as "RF frame", is transmitted by the wheel unit and received by the ECU in order to transmit pressure parameters in relation to the wheel in particular.

The radiofrequency communication is carried out in Bluetooth® Low Energy (commonly designated "BLE") mode, enabling the short-range two-way exchange of data using UHF (ultra-high-frequency) radio waves on the 2.4 GHz frequency band.

The advantage of Bluetooth® Low Energy over "conventional" Bluetooth® is that it makes it possible to send a small amount of data while consuming very little energy.

It is possible to use Bluetooth® Low Energy in "advertising" mode, in which the wheel unit transmits periodic signals. The ECU analyzes its environment by carrying out scans (referred to as "scan request") for very short periods of time in order to check whether these signals are transmitted by the wheel unit. In other words, the wheel unit transmits radiofrequency signals. The ECU confirms orderly reception or acknowledges the radiofrequency signals by returning a radiofrequency frame to the wheel unit. In reality, a communication search is carried out between the wheel unit and the ECU.

It is also possible to use Bluetooth® Low Energy in "connected" mode, in which communication between the wheel unit and the ECU is established correctly after the "advertising" mode. This connected mode makes it possible to transmit pressure data using radiofrequency frames.

This "connected mode" consumes a very large amount of energy. There are what are known as "acknowledgement" mechanisms that optimize the energy consumption of the wheel unit during Bluetooth® Low Energy communication according to the feedback loop of the receiver.

However, this type of mechanism does not exist for "advertising" mode, but it is necessary to reduce or optimize the energy consumption of the wheel unit regardless of the mode used in order to prolong the service life of the battery.

SUMMARY OF THE INVENTION

An aspect of the invention aims to solve this problem by proposing a communication method for a Bluetooth® Low Energy monitoring system that makes it possible to optimize the radiofrequency transmission power of the wheel unit when it communicates in "advertising" mode, in order to limit its electrical consumption.

An aspect of the invention relates to a communication method for a monitoring system comprising a wheel unit able to carry out measurements in a vehicle and an electronic control unit remote from the wheel unit. The wheel unit comprises a first radiofrequency transceiver device intended to communicate with a second radiofrequency transceiver device provided on the electronic control unit by way of Bluetooth® Low Energy communication in order to transmit the measurements to the electronic control unit and establish two-way communication between the wheel unit and the electronic control unit. The wheel unit is able to operate in an "advertising" communication mode in which it transmits periodic signals of short duration to attempt to connect to the electronic control unit. The electronic control unit is able to acknowledge the periodic signals by transmitting a frame of radiofrequency signals to the wheel unit.

According to an aspect of the invention, the method comprises a step of automatically adapting the radiofrequency transmission power of the wheel unit when the wheel unit is in "advertising" mode, during which the wheel unit transmits signals of variable radiofrequency power so as to determine a minimum radiofrequency power starting from which the electronic control unit is capable of acknowledging at least one radiofrequency signal by transmitting a frame of radiofrequency signals to the wheel unit.

An aspect of the invention thus provides a communication method for a Bluetooth® Low Energy monitoring system that makes it possible to optimize the radiofrequency transmission power of the wheel unit when it communicates in "advertising" mode, in order to limit its electrical consumption and extend the service life of the battery (or cell).

The radiofrequency transmission power of the wheel unit is adapted dynamically according to the reception context.

It is possible to regularly retrieve the radiofrequency power data delivered by the wheel unit and obtained after each power optimization sequence, for processing in a set of networked servers ("cloud") via the electronic control unit.

This information is very useful because it provides details about the radiofrequency powers actually used and optimized to carry out communication in vehicles throughout the lifetime of the product and in all real operating situations (vehicle type, wheel type, weather scenarios, urban scenarios, motorways, countryside, etc.).

These data make it possible to optimize radiofrequency architectures in future Bluetooth® low-frequency wheel unit projects.

Indeed, starting from the power that is actually useful, it is possible to adjust the type of battery, the dimensions of the antenna and, indirectly, the dimensions of the housing that accommodates these elements.

As a variant, a maximum radiofrequency power threshold is defined. The wheel unit starts by transmitting a radiofrequency signal having the maximum radiofrequency power threshold, and then transmits radiofrequency signals while reducing their power until the electronic control unit is no longer able to decode the radiofrequency signal. The power of the last acknowledged radiofrequency signal is defined as the minimum radiofrequency power by the wheel unit.

As a variant, a minimum radiofrequency power threshold is defined. The wheel unit starts by transmitting a radiofrequency signal having the minimum radiofrequency power threshold, and then transmits radiofrequency signals while increasing their power until the electronic control unit acknowledges a first signal. The power of the first acknowledged radiofrequency signal is defined as the minimum radiofrequency power by the wheel unit.

These auto-calibration modes have the advantage of being easy and quick to implement, thereby limiting energy consumption. According to these two variants, only the wheel unit carries out an action in order to determine the minimum radiofrequency power.

As a variant, multiple series of transmissions of radiofrequency signals are carried out, including a first series with radiofrequency signals having a predefined maximum radiofrequency power. Each following series of transmissions is carried out with radiofrequency signals having a decreasing power level. For each series of transmissions, multiple radiofrequency signals of the same power are transmitted per revolution of a wheel and at equidistant angular positions over the wheel. The wheel unit determines a rate of successful reception through statistical calculation and for multiple revolutions of the wheel. The minimum power level is determined based on a predefined acceptable rate of successful reception.

As a variant, multiple series of transmissions of radiofrequency signals are carried out, including a first series with radiofrequency signals having a predefined minimum radiofrequency power. Each following series of transmissions is carried out with radiofrequency signals having an increasing power level. For each series of transmissions, multiple radiofrequency signals of the same power are transmitted per revolution of a wheel and at equidistant angular positions over the wheel. The wheel unit determines a rate of successful reception through statistical calculation and for multiple revolutions of the wheel. The minimum power level is determined based on a predefined acceptable rate of successful reception.

These variants make it possible to take into account areas of non-reception that block the radiofrequency signal and for which the electronic control unit is not able to respond. These areas of non-reception are due to elements of the vehicle, such as the shock absorber or bodywork elements, for example.

As a variant, the method comprises a dichotomy-based calculation. A minimum power threshold $S_{min}$ and a maximum power threshold $S_{max}$ are defined. An average power level is defined according to the relationship $P_{av}=(S_{min}+S_{max})/2$. The wheel unit transmits a signal with the average power level $P_{av}$ and checks acceptance thereof by the electronic control unit. The average power level $P_{av}$ is considered to be the new maximum power threshold $S_{max}$ if the electronic control unit accepts the signal transmitted with the average power level $P_{av}$. The average power level is considered to be the new minimum power threshold $S_{min}$ if the electronic control unit does not accept the signal transmitted with the average power level $P_{av}$. The minimum radiofrequency power is determined when $S_{min}$ and $S_{max}$ are equal.

This variant allows dichotomy-based convergence, thereby improving the accuracy of the minimum power level.

As a variant, a maximum radiofrequency power threshold is defined. The wheel unit starts by transmitting a radiofrequency signal having the maximum radiofrequency power threshold and then transmits radiofrequency signals while reducing their power until the electronic control unit is no longer able to decode the signal. The electronic control unit deactivates its ability to acknowledge radiofrequency signals in order to signal to the wheel unit that the power of the last received radiofrequency signal should be defined as the minimum radiofrequency power.

As a variant, a minimum radiofrequency power threshold is defined. The wheel unit starts by transmitting a radiofrequency signal having the minimum radiofrequency power threshold and then transmits radiofrequency signals while increasing their power until the electronic control unit acknowledges the signal. The electronic control unit activates its ability to accept signals in order to signal to the wheel unit that the power of the first acknowledged radiofrequency signal should be defined as the minimum radiofrequency power.

These last two variants make it possible to increase the reliability of the method.

The wheel unit is mounted on a wheel of the vehicle and is intended to measure the pressure inside a tire.

An aspect of the invention also relates to a vehicle comprising at least one monitoring system implementing the communication method as defined above.

BRIEF DESCRIPTION OF THE DRAWINGS

The FIGURE is a schematic plan view of a motor vehicle that comprises a TPMS monitoring system able to implement a communication method according to an aspect of the invention.

DETAILED DESCRIPTION OF EXEMPLARY EMBODIMENTS

The FIGURE illustrates a motor vehicle 10 that comprises an electronic control unit 12 and four wheels 14a, 14b, 14c, 14d that are each equipped with a wheel unit 16a, 16b, 16c, 16d, respectively.

In order not to weigh down the description, only one wheel unit 16a is described below, with the four wheel units 16a, 16b, 16c, 16d having a similar design and operation.

The electronic control unit 12 of the motor vehicle 10, known by the name "ECU", comprises an electronic computer and a memory (neither shown).

The electronic control unit 12 also comprises a radiofrequency receiver 20.

The wheel unit 16a comprises a housing that encloses a computer 22, a battery 24 and a memory 26.

In addition, the wheel unit 16a comprises a set of sensors 30 dedicated to measuring operating parameters of the wheel unit 16a.

This set of sensors 30 comprises a first temperature sensor able to measure a temperature parameter T, a second sensor, of accelerometer type, able to measure the acceleration experienced by the wheel unit 16a, and a third pressure sensor able to measure the inflation pressure of the tire of the associated wheel 14a.

The measurements taken by this set of sensors 30 may be transmitted to the electronic control unit 12 of the motor vehicle 10 via messages transmitted by the transmitter 28 of the associated wheel unit 16a.

An aspect of the invention relates to a communication method for a TPMS (tire pressure monitoring system) pressure monitoring system, which typically comprises at least one wheel unit 16a arranged inside the chamber defined by the tire and the rim of the wheel 14a of a vehicle, and remote computing means in one-way or two-way radiofrequency communication with this wheel unit 16a, these computing means generally being located in the on-board electronic control unit 12 of the vehicle (commonly referred to as "ECU"), the electronic control unit 12 and the wheel unit 16a being duly programmed to implement the method according to an aspect of the invention.

The wheel unit 16a may be fixed inside the tread of the tire, or to the inflation valve of this tire, which inflation valve is mounted inside an orifice formed on the rim of a wheel 14a of the vehicle 10.

The wheel unit 16a of the tire is typically supplied with power by a non-rechargeable battery 24 that may have a service life of ten years, for example.

The wheel unit 16a and the ECU 12 communicate via a radiofrequency communication network. The wheel unit 16a comprises a first radiofrequency transceiver device 28 and the ECU 12 comprises a second radiofrequency transceiver device 20.

A radiofrequency frame, generally referred to as "RF frame", is transmitted by the wheel unit 16a and received by the ECU 12 in order to transmit pressure parameters in relation to the wheel 14a.

The radiofrequency communication is carried out in Bluetooth® Low Energy (commonly designated "BLE") mode, enabling the short-range two-way exchange of data using UHF radio waves on the 2.4 GHz frequency band.

The wheel unit 16a is able to operate in two communication modes, namely an "advertising" mode in which periodic signals of short duration are transmitted by the wheel unit 16a to attempt to connect to the electronic control unit 12 and a "connected" mode in which a stable connection is established between the wheel unit 16a and the electronic control unit 12 in order to transmit pressure measurements.

"Advertising" mode is used first of all to attempt to establish a radiofrequency connection to the electronic control unit 12 and to change to "connected" mode, which makes it possible to exchange pressure information via radiofrequency frames between the wheel unit 16a and the electronic control unit 12. There is a feedback loop in "connected" mode that makes it possible to adapt the power of the transmission signal automatically. This feedback loop is provided by the Bluetooth® Low Energy BLE 5.0 standard.

For an aspect of the invention, it is the "advertising" communication mode that is used. "Connected" mode is not used.

In "advertising" communication mode, two-way communication is established between the wheel unit 16a and the electronic control unit 12. The electronic control unit 12 acknowledges the periodic signals by transmitting a frame of radiofrequency signals to the wheel unit 16a. In other words, the electronic control unit 12 confirms the orderly reception of the received signal by returning a specific radiofrequency frame to the wheel unit 16a. This operation of transmitting frames of radiofrequency signals is commonly designated by the term "scan request".

The transmission power of the wheel unit 16a is fixed and high in order to ensure successful radiofrequency reception by the electronic control unit 12.

When the electronic control unit 12 of the vehicle 10 is activated, the electronic control unit 12 of the monitoring system analyzes or scans its environment to attempt to connect to the wheel unit 16a. When the electronic control unit 12 picks up a signal transmitted by the wheel unit 16a, the electronic control unit 12 accepts or acknowledges this signal and signals this to the wheel unit 16a.

The vehicle 10 may be moving or stationary.

According to an aspect of the invention, the communication method for the pressure monitoring system comprises a step of automatically adapting the radiofrequency transmission power of the wheel unit 16a when the wheel unit 16a is in "advertising" mode, during which the wheel unit 16a transmits signals of variable radiofrequency power so as to determine a minimum radiofrequency power starting from which the electronic control unit 12 is capable of acknowledging at least one signal by transmitting a frame of radiofrequency signals to the wheel unit 16a.

According to one variant, the wheel unit 16a operates in auto-calibration mode, in which the wheel unit 16a checks whether the electronic control unit 12 was capable of reading a message transmitted by the wheel unit 16a. The wheel unit 16a operates autonomously with minimum participation of the electronic control unit 12, which merely acknowledges or does not acknowledge the message transmitted by the wheel unit 16a.

According to one variant, a maximum radiofrequency power threshold is defined. The wheel unit 16a starts by transmitting a radiofrequency signal having this maximum radiofrequency power threshold and then transmits other radiofrequency signals while gradually reducing their power until the electronic control unit 12 is no longer able to decode the signal, signifying that the power of the signal is not high enough to establish radiofrequency communication. The power of the last acknowledged radiofrequency signal is then defined as the minimum radiofrequency power by the wheel unit 16a.

According to one variant, before the step of determining the maximum radiofrequency power threshold, it is first checked that a known electronic control unit 12 responds to the signals transmitted at the defined nominal power.

The maximum radiofrequency power threshold is +4 dBm, for example.

The wheel unit 16a operating in "advertising" mode starts by transmitting a radiofrequency signal with a radiofrequency power of +4 dBm. If the signal is acknowledged by the electronic control unit 12, the power level of the following radiofrequency signal is lowered and is therefore less than +4 dBm.

The process stops when the electronic control unit 12 no longer acknowledges a transmitted signal. The wheel unit 16a then considers the previous signal to be the one having the minimum radiofrequency power and stores this minimum radiofrequency power value.

According to another variant, a minimum radiofrequency power threshold is defined.

During the step of automatically adapting the power, the wheel unit 16a starts by transmitting a radiofrequency signal having the minimum radiofrequency power threshold, and then transmits radiofrequency signals while increasing their power until the electronic control unit 12 acknowledges a first signal.

The power of the first acknowledged radiofrequency signal is defined as the minimum radiofrequency power by the wheel unit 16a.

According to one variant, before the step of determining the minimum radiofrequency power threshold, it is first checked that a known electronic control unit responds to the signals transmitted at the defined nominal power.

The minimum radiofrequency power threshold is −4 dBm, for example.

The wheel unit 16a operating in "advertising" mode starts by transmitting a radiofrequency signal with a radiofrequency power of −4 dBm. If the signal is not acknowledged by the electronic control unit 12, the power level of the following radiofrequency signal is incremented and is therefore greater than −4 dBm.

The process stops when the electronic control unit 12 acknowledges a first transmitted signal. The wheel unit 16a then considers this first signal to be the one having the minimum radiofrequency power and stores this minimum radiofrequency power value.

According to another variant, multiple series of transmissions are carried out, including a first series with radiofrequency signals having a predefined maximum radiofrequency power. This maximum radiofrequency power is +4 dBm, for example.

Each following series of transmissions is carried out with radiofrequency signals having a gradually decreasing power level. For each series of transmissions, multiple radiofrequency signals of the same power are transmitted per revolution of a wheel and at equidistant angles over the wheel 14a.

For example, three radiofrequency signals may be transmitted with identical content over one revolution of the wheel 14a, with the same power level, every 120°.

The wheel unit 16a determines a rate of successful reception through statistical calculation and for multiple revolutions of the wheel 14a. The power level of the signal is then reduced for the following series of measurements.

The minimum power level is determined based on a predefined acceptable rate of successful reception.

If, with the maximum radiofrequency power of +4 dBm, for example, the electronic control unit 12 receives the majority of the signals, the success rate is high and above the predefined acceptable rate of successful reception.

A new series of transmissions of radiofrequency signals is then carried out with a radiofrequency power level less than +4 dBm.

The radiofrequency power is reduced in the following series until the success rate is no longer acceptable. The radiofrequency power of the last series that led to an acceptable rate of successful reception is defined as the minimum radiofrequency power.

Indeed, if the last series of signals under test leads to a success rate below the predefined acceptable rate of successful reception, it is the penultimate series of signals under test that led to a success rate above the predefined acceptable rate of successful reception that is considered to define the minimum power level.

This variant makes it possible to take into account areas of non-reception (also referred to as "black spots") that block the radiofrequency signal and for which the electronic control unit 12 is not able to respond. These areas of non-reception are due to elements of the vehicle, such as the shock absorber or bodywork elements, for example.

As a variant, in a similar manner, multiple series of transmissions are carried out, including a first series with radiofrequency signals having a predefined minimum radiofrequency power. Each following series of transmissions is carried out with radiofrequency signals having a gradually increasing power level. For each series of transmissions, multiple radiofrequency signals of the same power are transmitted per revolution of a wheel 14a and at equidistant angles over the wheel 14a. For example, three radiofrequency signals may be transmitted with identical content over one revolution of the wheel 14a, with the same power level, every 120°. The wheel unit 16a determines a rate of successful reception through statistical calculation and for multiple revolutions of the wheel 14a. The wheel unit 16a determines a rate of successful reception through statistical calculation and for multiple revolutions of the wheel 14a. The minimum power level is determined based on a predefined acceptable rate of successful reception.

According to another variant, the method comprises a dichotomy-based calculation. A minimum power threshold $S_{min}$ and a maximum power threshold $S_{max}$ are defined. An average power level is also defined according to the relationship $P_{av}=(S_{min}+S_{max})/2$.

The wheel unit 16a transmits a signal with the average power level $P_{av}$ and checks whether it is acknowledged by the electronic control unit 12.

The average power level $P_{av}$ is considered to be the new maximum power threshold $S_{max}$ if the electronic control unit 12 acknowledges the signal transmitted with the average power level $P_{av}$.

Otherwise, the average power level is considered to be the new minimum power threshold $S_{min}$ if the electronic control unit 12 does not acknowledge the signal transmitted with the average power level $P_{av}$.

This algorithm is carried out for as long as $S_{min}$ and $S_{max}$ are different. The minimum radiofrequency power is determined when $S_{min}$ and $S_{max}$ are equal. The last maximum power threshold $S_{max}$ under test is thus considered to be the minimum radiofrequency power.

The above variants are applicable when the wheel unit 16a operates in an auto-calibration (or automatic) mode, the electronic control unit 12 merely acknowledging or not acknowledging the signals.

According to another variant, the electronic control unit 12 takes the lead in defining the minimum radiofrequency power.

The wheel unit 16a transmits a radiofrequency signal with a maximum power, and reduces the power until the electronic control unit 12 considers that the received field level is within the acceptable lower limit.

In other words, a maximum radiofrequency power threshold is defined. The wheel unit 16a starts by transmitting a radiofrequency signal having the maximum radiofrequency power threshold and then transmits radiofrequency signals while reducing their power until the electronic control unit 12 is no longer able to decode or acknowledge the signal.

The power of the last signal acknowledged by the electronic control unit 12 is considered to be the minimum radiofrequency power. The electronic control unit 12 deactivates its ability to acknowledge signals in order to signal to the wheel unit 16a that the power of the last received radiofrequency signal should be defined as the minimum radiofrequency power.

The electronic control unit 12 thereafter ignores the received radiofrequency frames. The wheel unit 16a understands that the signal is not received by the electronic control unit 12 and thus defines the minimum acceptable power level at the previous functional value.

According to another variant, instead of starting from an upper power limit, the wheel unit 16a starts by transmitting signals within the lower power limit until detecting an acknowledgement by the electronic control unit 12.

Indeed, a minimum radiofrequency power threshold is defined. The wheel unit 16a starts by transmitting a radiofrequency signal having the minimum radiofrequency power threshold and then transmits following radiofrequency signals while increasing their power each time until the electronic control unit 12 acknowledges the signal.

The electronic control unit 12 then activates its ability to acknowledge signals in order to signal to the wheel unit 16a that the power of the first acknowledged radiofrequency signal should be defined as the minimum radiofrequency power.

As a variant, provision is made for a waiting time after a signal that has not been acknowledged by the electronic control unit 12.

The variants described above are given for the case of a wheel unit 16a by way of example.

As a variant, it is possible to regularly retrieve the radiofrequency power data delivered by the wheel unit 16a and obtained after each power optimization sequence, for processing in a set of networked servers ("cloud") via the electronic control unit 12.

This information is very useful because it provides details about the radiofrequency powers actually used and optimized to carry out communication in vehicles throughout the lifetime of the product and in all real operating situations (vehicle type, wheel type, weather scenarios, urban scenarios, motorways, countryside, etc.).

These data make it possible to optimize radiofrequency architectures in future Bluetooth® low-frequency wheel unit projects.

Indeed, starting from the power that is actually useful, it is possible to adjust the type of battery, the dimensions of the antenna and, indirectly, the dimensions of the housing that accommodates these elements.

The invention claimed is:

1. A communication method for a monitoring system comprising a wheel unit able to carry out measurements in a vehicle and an electronic control unit remote from the wheel unit, the wheel unit comprising a first radiofrequency transceiver device intended to communicate with a second radiofrequency transceiver device-provided in the electronic control unit by way of Bluetooth® communication enabling the short-distance two-way exchange of data using low-energy ultra-high-frequency radio waves to transmit the measurements to the electronic control unit and establish two-way communication between the wheel unit and the electronic control unit, the wheel unit being able to operate in an "advertising" communication mode in which it transmits periodic signals of short duration to attempt to connect to the electronic control unit, the electronic control unit being able to acknowledge the periodic signals by transmitting a frame of radiofrequency signals to the wheel unit, automatically adapting the radiofrequency transmission power of the wheel unit when the wheel unit is in "advertising" mode, during which the wheel unit transmits signals of variable radiofrequency power so as to determine a minimum radiofrequency power starting from which the electronic control unit is capable of acknowledging at least one signal by transmitting a frame of radiofrequency signals to the wheel unit.

2. The method as claimed in claim 1, wherein a maximum radiofrequency power threshold is defined, the wheel unit starting by transmitting a radiofrequency signal having the maximum radiofrequency power threshold, and then transmitting radiofrequency signals while reducing their power until the electronic control unit is no longer able to decode the radiofrequency signal, the power of the last acknowledged radiofrequency signal being defined as the minimum radiofrequency power by the wheel unit.

3. The method as claimed in claim 1, wherein a minimum radiofrequency power threshold is defined, the wheel unit starting by transmitting a radiofrequency signal having the minimum radiofrequency power threshold, and then transmitting radiofrequency signals while increasing their power until the electronic control unit acknowledges a first radiofrequency signal, the power of the first acknowledged radiofrequency signal being defined as the minimum radiofrequency power by the wheel unit.

4. The method as claimed in claim 1, wherein multiple series of transmissions of radiofrequency signals are carried out, including a first series with radiofrequency signals having a predefined maximum radiofrequency power, each following series of transmissions being carried out with radiofrequency signals having a decreasing power level, for each series of transmissions, multiple radiofrequency signals of the same power being transmitted per revolution of a wheel and at equidistant angular positions over the wheel, the wheel unit determining a rate of successful reception through statistical calculation and for multiple revolutions of the wheel, the minimum power level being determined based on a predefined acceptable rate of successful reception.

5. The method as claimed in claim 1, wherein multiple series of transmissions of radiofrequency signals are carried out, including a first series with radiofrequency signals having a predefined minimum radiofrequency power, each following series of transmissions being carried out with radiofrequency signals having an increasing power level, for each series of transmissions, multiple radiofrequency signals of the same power being transmitted per revolution of a wheel and at equidistant angular positions over the wheel, the wheel unit determining a rate of successful reception through statistical calculation and for multiple revolutions of the wheel, the minimum power level being determined based on a predefined acceptable rate of successful reception.

6. The method as claimed in claim 1, further comprising a dichotomy-based calculation, a minimum power threshold $S_{min}$ and a maximum power threshold $S_{max}$ being defined, an average power level being defined according to the relationship $P_{av}=(S_{min}+S_{max})/2$, the wheel unit transmitting a signal with the average power level $P_{av}$ and checking acceptance thereof by the electronic control unit, the average power level $P_{av}$ being considered to be the new maximum power threshold $S_{max}$ if the electronic control unit accepts the signal transmitted with the average power level $P_{av}$, the average power level being considered to be the new minimum power threshold $S_{min}$ if the electronic control unit does not accept the signal transmitted with the average power level $P_{av}$, the minimum radiofrequency power being determined when $S_{min}$ and $S_{max}$ are equal.

7. The method as claimed in claim 1, wherein a maximum radiofrequency power threshold is defined, the wheel unit starting by transmitting a radiofrequency signal having the maximum radiofrequency power threshold and then transmitting radiofrequency signals while reducing their power until the electronic control unit is no longer able to decode the signal, the electronic control unit deactivating its ability to acknowledge signals in order to signal to the wheel unit that the power of the last received radiofrequency signal should be defined as the minimum radiofrequency power.

8. The method as claimed in claim 1, wherein a minimum radiofrequency power threshold is defined, the wheel unit starting by transmitting a radiofrequency signal having the minimum radiofrequency power threshold and then transmitting radiofrequency signals while increasing their power until the electronic control unit acknowledges the radiofrequency signal, the electronic control unit activating its ability to acknowledge signals in order to signal to the wheel unit that the power of the first acknowledged radiofrequency signal should be defined as the minimum radiofrequency power.

9. The method as claimed in claim 1, wherein the wheel unit is mounted on a wheel of a vehicle and intended to monitor the pressure inside a tire.

10. A vehicle, comprising at least one monitoring system implementing the communication method as defined in claim 1.

* * * * *